US008824667B2

(12) United States Patent
Mazurenko et al.

(10) Patent No.: US 8,824,667 B2
(45) Date of Patent: Sep. 2, 2014

(54) TIME-DOMAIN ACOUSTIC ECHO CONTROL

(75) Inventors: Ivan Leonidovich Mazurenko, Khimki (RU); Dmitry Nikolaevich Babin, Moscow (RU); Denis Vassilevich Parfenov, Moscow (RU); Alexander Alexandrovich Petyushko, Bryansk (RU); Alexander Markovic, Media, PA (US)

(73) Assignee: LSI Corporation, San Jose, CA (US)

( * ) Notice: Subject to any disclaimer, the term of this patent is extended or adjusted under 35 U.S.C. 154(b) by 354 days.

(21) Appl. No.: 13/222,050

(22) Filed: Aug. 31, 2011

(65) Prior Publication Data

US 2012/0201370 A1 Aug. 9, 2012

(30) Foreign Application Priority Data

Feb. 3, 2011 (RU) ................................ 2011103938

(51) Int. Cl.
*H04M 9/08* (2006.01)
*H04B 3/20* (2006.01)
*H04B 3/23* (2006.01)

(52) U.S. Cl.
CPC ........ *H04M 9/082* (2013.01); *H04B 3/23* (2013.01)
USPC ...................... 379/406.05; 370/289

(58) Field of Classification Search
None
See application file for complete search history.

(56) References Cited

U.S. PATENT DOCUMENTS

| 5,146,470 A | 9/1992 | Fujii et al. |
| 5,327,495 A * | 7/1994 | Shenoi et al. ............ 379/406.08 |
| 5,631,899 A | 5/1997 | Duttweiler |
| 5,933,495 A | 8/1999 | Oh |
| 6,622,030 B1 * | 9/2003 | Romesburg et al. ........... 455/570 |
| 7,610,197 B2 | 10/2009 | Cruz-Zeno et al. |
| 2003/0076947 A1 * | 4/2003 | Furuta et al. ............. 379/406.01 |
| 2003/0123674 A1 * | 7/2003 | Boland .......................... 381/66 |
| 2006/0280135 A1 * | 12/2006 | Mandelstam ................. 370/286 |
| 2009/0279686 A1 * | 11/2009 | Tan .......................... 379/406.01 |

OTHER PUBLICATIONS

Perry, A.; "Fundamentals of Voice-Quality Engineering in Wireless Networks"; Cambridge University Press, 2006.
"Series G: Transmission Systems and Media, Digital Systems and Networks"; ITU-T; G.160; Voice Enhancement Devices; Jun. 2008.

(Continued)

*Primary Examiner* — Fan Tsang
*Assistant Examiner* — Jeffrey Lytle
(74) *Attorney, Agent, or Firm* — Mendelsohn, Drucker & Dunleavy, P.C.; Craig M. Brown; Steve Mendelsohn

(57) ABSTRACT

In one embodiment, an acoustic echo control (AEC) module receives an outgoing signal and an incoming signal, which, at various times, contains acoustic echo corresponding to the outgoing signal. The AEC module has a delay estimation block that estimates, in the time domain, the echo delay using an adaptive filtering technique. This delay estimation is used to align samples of the incoming signal having acoustic echo with the corresponding samples of the outgoing signal from which the acoustic echo originated. The AEC module determines whether or not samples of the incoming signal contain acoustic echo based on the aligned outgoing signal, and the determinations are applied to a hangover counter. The AEC module then suppresses acoustic echo in the incoming signal and adds comfort noise to the incoming signal. The amount of echo suppression performed is gradually increased or decreased based on comparisons of the counter to a hangover threshold.

15 Claims, 2 Drawing Sheets

(56) References Cited

OTHER PUBLICATIONS

"Digital Cellular Telecommunications System (Phase 2+); Universal Mobile Telecommunications System (UMTS); Performance Characterization of the Adaptive Multi-Rate (AMR) Speech Codec (3GPP TR 26.975 version 7.0.0 Release 7)" ETSI TR 126 975 v7.0.0; Jun. 2007.

Duttweiler, D. "Proportionate Normalized Least-Mean-Squares Adaptation In Echo Cancellers", IEEE Transactions On Speech Audio Processing; vol. 8, No. 5; Sep. 2000.

Gay, S. & Tavathia, S. "The Fast Affine Projection Algorithm"; Acoustics Research Department; AT&T Bell Laboratories.

Orfanidis, S.; "Optimum Signal Processing: An Introduction"; 2nd Ed.; Rutgers University; 1996-2007.

Umeda et al.; "An Adaptive Filtering Algorithm Using an Orthogonal Projection to an Affine Subspace and its Properties"; Electronics and Communications in Japan; vol. 67-A, No. 5; 1984; pp. 19-27.

\* cited by examiner

TIME-DOMAIN ACOUSTIC ECHO CONTROL

BACKGROUND OF THE INVENTION

1. Field of the Invention

The present invention relates to signal processing, and, more specifically but not exclusively, to techniques for controlling acoustic echo in telephone communication networks.

2. Description of the Related Art

As used herein, the term "acoustic signal" refers to audible sound, while the term "audio signal" refers to electronic signals, such as the electronic signals generated by a microphone receiving an acoustic signal and the electronic signals converted by a loudspeaker into an acoustic signal. If the term "signal" is used without a qualifying adjective, it should be assumed to refer to an audio signal, not an acoustic signal. In a telephone network, two types of echo may be introduced into the audio signals transmitted between user equipment at opposite ends of a telephone call: hybrid echo and acoustic echo. Hybrid echo, which is introduced by a network device known as a hybrid, occurs when there is an impedance mismatch in the hybrid or another kind of hybrid imbalance takes place, e.g. signal pickup. The hybrid imbalance allows a portion of the incoming audio signal received from the far end of the network to be reflected back to the far end. The reflected portion of the incoming audio signal is mixed with the audio signal generated by the microphone at the near end of the network, and the resulting outgoing audio signal is transmitted from the near end to the far end. Hybrid echo typically has a relatively low delay and a short echo path. Further, hybrid echo is relatively stable in terms of echo path change and echo return loss.

Acoustic echo occurs when acoustic signals, generated by the loudspeaker of the near-end user equipment based on the incoming audio signal transmitted from the far end, are picked up by the microphone of the near-end user equipment along with other acoustic signals at the near end. The resulting audio signal is transmitted to the far end. Although generated based on acoustic signals, the term "acoustic echo" refers to the portion of the electrical audio signal corresponding to those acoustic signals, not to the acoustic signals themselves.

Thus, when both hybrid echo and acoustic echo are present at the near end, the outgoing audio signal transmitted to the far end will contain contributions from both echo sources, which tend to distort the acoustic signals generated by the loudspeaker at the far end. Analogously, hybrid and/or acoustic echo present at the far end will tend to distort the acoustic signals generates by the loudspeaker at the near end.

In a typical wireless telephone network, an outgoing audio signal is compressed with a low-bitrate codec such as an adaptive multi-rate (AMR) codec. As a result, the acoustic echo in the outgoing audio signal does not have a sample-by-sample linear correlation with the source acoustic signal. In typical cases, the acoustic echo is delayed by 150 to 200 ms in jitter buffers, the network signal encoder and decoder, and at other network points. Unlike hybrid echo, which is relatively stable, acoustic echo dynamically changes when, for example, the user equipment moves toward or away from reflective objects, or the user begins or stops speaking.

The problem of controlling hybrid echo has been adequately addressed for some time now. The problem of controlling acoustic echo, on the other hand, has not been adequately addressed, particularly in the area of wireless communications systems. Individual mobile phone manufacturers are responsible for designing phones that control acoustic echo. Nevertheless, many cheap mobile phones are available that either do not adequately control acoustic echo or do not control acoustic echo at all. Mobile phones that do not adequately control acoustic echo often contain unwanted side effects such as noise clipping and background noise discontinuity. These unwanted side effects are often more adverse to speech than the acoustic echo.

Generally, there are two approaches that may be used to control echo: automatic echo cancellation and echo suppression. Automatic echo cancellation approaches commonly use linear filtering-based algorithms, such as the normalized least mean square (NLMS) algorithm, the proportionate NLMS (PNLMS) algorithm, the recursive least squares (RLS) algorithm, the affine projection algorithm (APA), or the fast affine projection (FAP) algorithm, to estimate the echo and remove the echo by subtracting it from the received signal. Some automatic echo cancellation approaches are discussed in U.S. Pat. No. 5,631,899, U.S. Pat. No. 5,146,470, D. L. Duttweiler, "Proportionate Normalized Least Mean Square Adaptation in Echo Cancellers," I.E.E.E. Transactions on Speech and Audio Processing, Vol. 8, September 2000, pgs. 508-518, K. Ozeki and T. Umeda, "An Adaptive Filtering Algorithm Using an Orthogonal Projection to an Affine Subspace and Its Properties," Electronics and Communications in Japan, Vol. 67-A, No. 5, 1984, Orfanidis and Sophocles J., "Optimum Signal Processing, An Introduction," MacMillan, New York, 1985, and S. L. Gay and S. Tavathia, "The fast Affine Projection Algorithm," ICASSP-95, 1995, the teachings all of which are incorporated herein by reference in their entirety.

In applications where acoustic echo is corrupted by non-linear codecs, the above-mentioned echo cancellation approaches are not adequate for at least three different reasons. First, implementation of these approaches is relatively complex because the echo path length is relatively large for acoustic echo (e.g., 200 ms or longer). Second, the above-mentioned linear algorithms do not adequately control non-linear echo. Third, the acoustic echo dynamically changes, and the above-mentioned linear algorithms do not converge quickly enough to account for the changes.

Generally, echo suppression approaches de-attenuate the level of echo in a received signal, without estimating the level of the echo and subtracting the estimated echo from received signal. Typical prior-art echo suppression approaches suppress echo by manipulating the amplitude of the frequency representation of the received signal, while keeping the phase unchanged. These approaches adequately control acoustic echo. However, typically, implementation of these approaches is relatively complex because they require two FFT operations for each frame of the signal. In addition, FFT-based approaches generally have a relatively significant delay due to FFT-related buffering and signal overlapping techniques that are applied to the output of a final inverse FFT operation.

SUMMARY OF THE INVENTION

In one embodiment, the present invention is a processor-implemented method for processing a signal. The method comprises (a) determining, in a time domain, how much acoustic echo to suppress in the signal, and (b) processing the signal in the time domain based on the determination of how much acoustic echo to suppress.

In another embodiment, the present invention is an apparatus comprising a processor adapted to process a signal. The apparatus comprises an acoustic echo detector and an acoustic echo controller. The acoustic echo detector is adapted to determine, in a time domain, how much acoustic echo to suppress in the signal. The acoustic echo controller is adapted to process the signal in the time domain based on the determination of how much acoustic echo to suppress.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Figure 1:
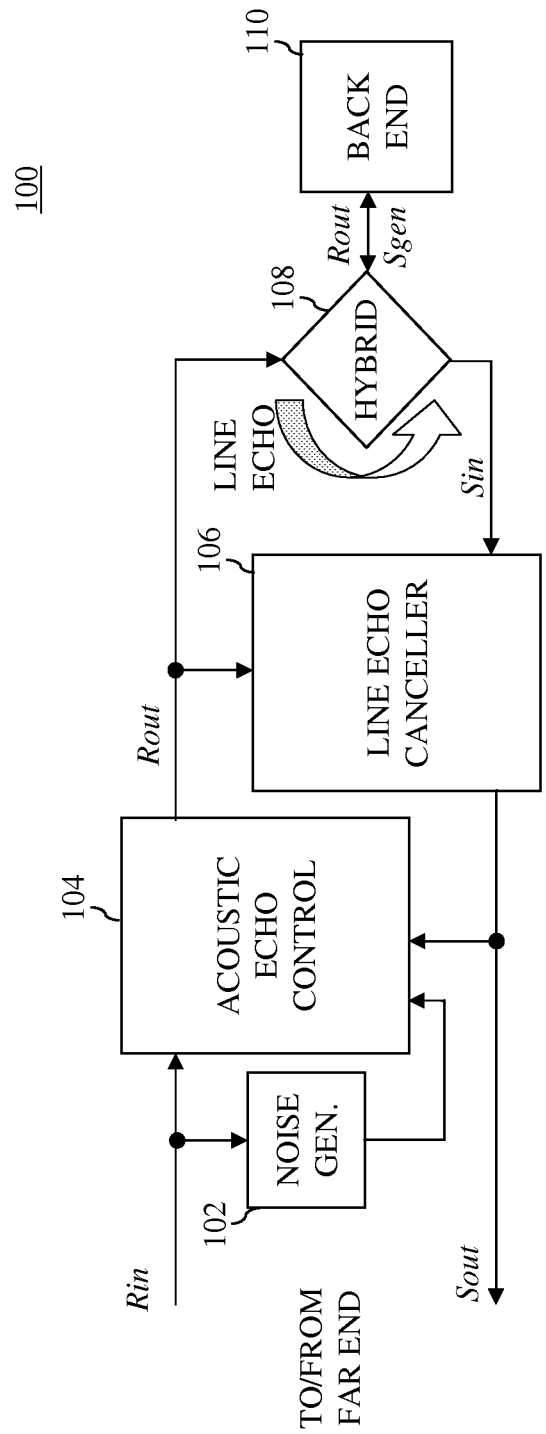
FIG. 1 shows a simplified block diagram of a near end of a telephone network according to one embodiment of the present invention.

FIG. 1 shows a simplified block diagram of a near end 100 of a telephone network according to one embodiment of the present invention. A first user located at near end 100 communicates with a second user located at a far end (not shown) of the network. The user at the far end may be, for example, a consumer using a communications device such as wireless phone, a speaker phone, or any other device from which acoustic echo may be generated. The user at near end 100 may be, for example, a consumer using a communications device such as a wireless phone, a wired phone, or any suitable device. As depicted in FIG. 1, near end 100 has two communication channels: (1) an upper channel for receiving incoming audio signal $R_{in}$ generated at the far end of the network and (2) a lower channel for transmitting outgoing audio signal $S_{out}$ to the far end. The far end may be implemented in a manner similar to that of near end 100, rotated by 180 degrees such that the far end receives signals via the lower channel and transmits signals via the upper channel.

Near end 100 includes hybrid 108, which routes incoming audio signals received from the far end to back end 110 for further processing (including rendering by the near end's loudspeaker (not shown)). Hybrid 108 also routes outgoing audio signals received from back end 110 (e.g., corresponding to audio signals generated by the near end's microphone (not shown)) toward the far end. Acoustic echo control module 104 filters the incoming audio signals received from the far end to reduce acoustic echo, while line echo canceller 106 filters the outgoing audio signals received from hybrid 108 to reduce hybrid echo.

In particular, acoustic echo control (AEC) module 104 processes incoming audio signal $R_{in}$ to generate filtered incoming audio signal $R_{out}$. Incoming signal $R_{in}$ is generated at the far-end user equipment and may include contributions corresponding to speech, music, and/or background noise. In addition, at various times during a telephone call, incoming signal $R_{in}$ comprises acoustic echo that is generated when (i) the loudspeaker of the far-end user equipment generates acoustic signals corresponding to outgoing audio signal $S_{out}$ and (ii) some of those acoustic signals are picked up by the microphone of the far-end user equipment. The resulting acoustic echo appears in incoming signal $R_{in}$ after a delay, referred to as an echo path delay, that may vary based on factors such as the transmission times between near end 100 and the far end, and the reflectivity of objects located near the far-end user equipment.

Acoustic echo control module 104, the operation of which is described in further detail below in relation to FIG. 2, detects the presence or absence of acoustic echo in incoming signal $R_{in}$. When acoustic echo is detected, acoustic echo control module 104 suppresses the acoustic echo. In addition to suppressing acoustic echo, acoustic echo control module 104 adds comfort noise to incoming signal $R_{in}$. If acoustic echo were suppressed and filtered incoming signal $R_{out}$ contained only silence, then the near-end user would hear nothing. As a result, the near-end user might think that the connection was lost. Comfort noise, which is added to prevent this scenario from occurring, is provided by noise generation module 102. Noise generation module 102 may be implemented using any suitable noise generation technique. For example, in less-complex implementations, noise generation module 102 may produce simple white or colored stochastic noise. As another example, in more-complex implementations, acoustic echo control module 104 may be implemented in conjunction with a noise reduction module that is equipped with noise detection, noise estimation, and smart noise generation features, similar to those described in U.S. application patent Ser. No. 11/216,624, the teachings of which are incorporated herein by reference in their entirety.

Filtered incoming signal $R_{out}$ is routed through hybrid 108, which may be implemented as a two-wire-to-four-wire converter that separates the upper and lower channels, to back end 110. Back end 110, which is part of near-end user equipment, may include, among other things, the loudspeaker and the microphone of the user equipment. Outgoing audio signal $S_{gen}$ generated at the back end 110 is routed through hybrid 108, where unwanted hybrid echo may be combined with outgoing signal $S_{gen}$ to generate outgoing audio signal $S_{in}$ having diminished quality. Line echo canceller 106 estimates the hybrid echo in signal $S_{in}$ based on filtered incoming signal $R_{out}$ and cancels the hybrid echo by subtracting the estimated hybrid echo from outgoing signal $S_{in}$ to generate outgoing signal $S_{out}$, which is transmitted to the far end. Note that noise generation module 102 and acoustic echo control module 104 may be implemented as part of the near-end user equipment or may be implemented in the network by the operator of the telephone network.

Figure 2:
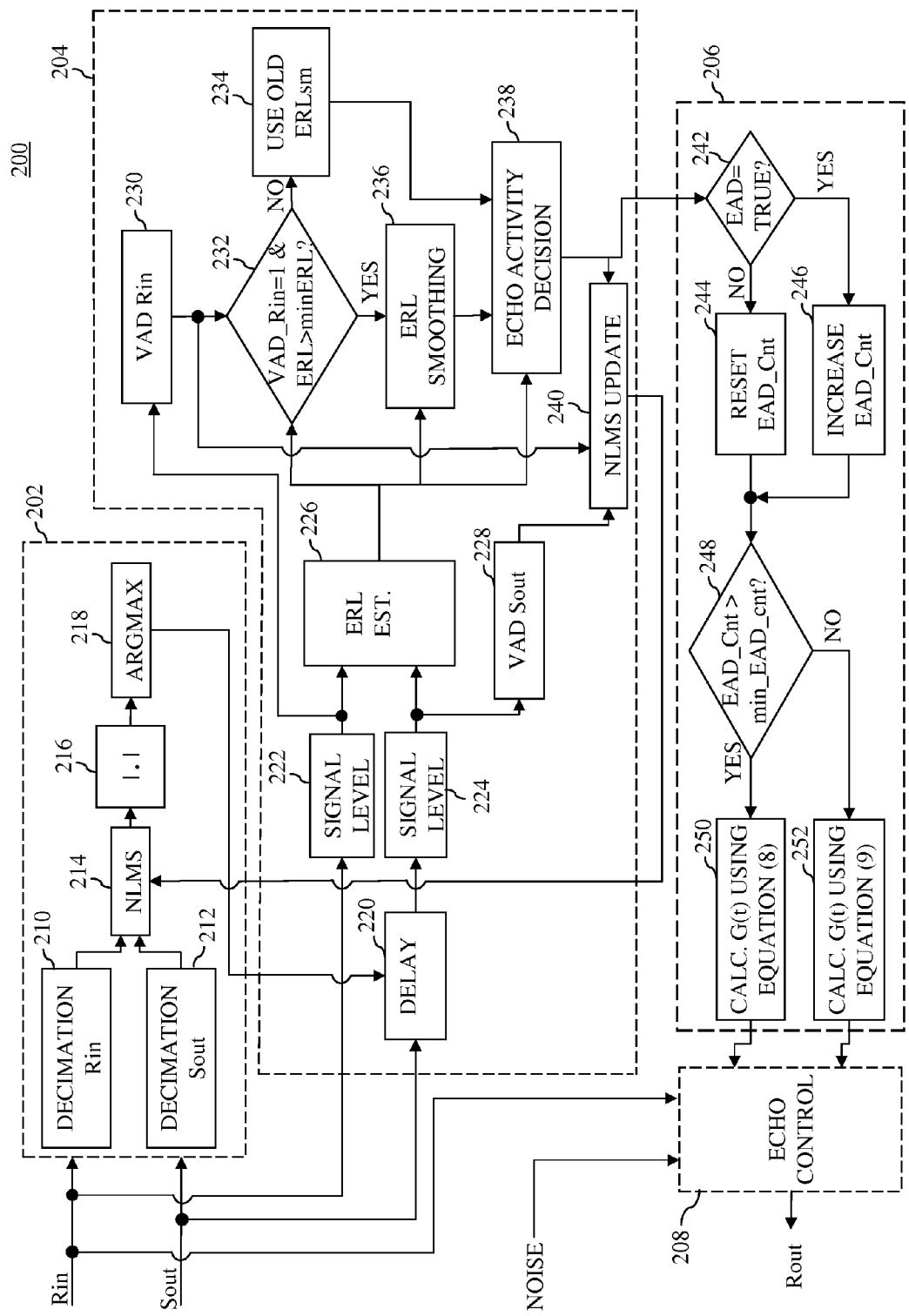
FIG. 2 shows a simplified dataflow diagram of processing performed by the acoustic echo control module of FIG. 1 according to one embodiment of the present invention.

FIG. 2 shows a simplified dataflow diagram 200 of processing performed by acoustic echo control module 104 according to one embodiment of the present invention. As an overview, dataflow diagram 200 has four major blocks (indicated by dashed lines): delay estimation block 202, echo activity detection block 204, echo suppression amount determination block 206, and echo control block 208. Together, delay estimation block 202, echo activity detection block 204, and echo suppression amount determination block 206 are herein referred to as an echo detection block that may be implemented as an echo detector. Delay estimation block 202 receives, in the time domain, a copy of filtered outgoing signal $S_{out}$ and incoming signal $R_{in}$, which, at various times, contains acoustic echo that originated from outgoing signal $S_{out}$. Note that, the copy of outgoing signal $S_{out}$ is herein referred to as the "outgoing signal $S_{out}$" for simplicity. The use of the term "outgoing signal $S_{out}$" herein in relation to FIG. 2 will be understood to refer to a copy of outgoing signal $S_{out}$.

Based on outgoing signal $S_{out}$ and incoming signal $R_{in}$, delay estimation block 202 estimates the delay that occurs from the time that outgoing signal $S_{out}$ is transmitted from near end 100 to the time that the corresponding acoustic echo arrives back at near end 100 in incoming signal $R_{in}$. Echo activity detection block 204 receives and delays outgoing signal $S_{out}$ based on the estimated echo delay derived by delay estimation block 202 such that the samples of incoming signal $R_{in}$ having acoustic echo are aligned with the corresponding samples of the delayed outgoing signal $S_{out}$ from which the acoustic echo originated.

Upon aligning outgoing signal $S_{out}$ with incoming signal $R_{in}$, echo activity detection block 204 detects whether or not samples of incoming signal $R_{in}$ contain acoustic echo based on the aligned outgoing signal $S_{out}$ and doubletalk is occurring. The determinations made by echo activity detection block 204 are used by echo suppression amount determination block 206 to generate a hangover counter value, and the hangover counter value is used to determine the amount of the echo suppression performed by echo control block 208. The amount of echo suppression is gradually increased or decreased based on whether or not the hangover counter of echo suppression amount determination block 206 is greater than a specified echo activity detection threshold value. Echo control block 208 suppresses acoustic echo in incoming signal $R_{in}$ based on the amount of echo suppression determined in echo suppression amount determination block 206 and adds comfort noise to generate filtered incoming signal $R_{out}$.

The details of delay estimation block 202, echo activity detection block 204, echo suppression amount determination 206, and echo control block 208 will now be addressed. Delay estimation block 202 dynamically estimates the echo delay using NLMS block 214, which implements an NLMS filtering algorithm. In order to minimize the complexity of NLMS block 214, incoming signal $R_{in}$ and outgoing signal $S_{out}$ are each decimated by reducing the number of samples in each signal by a decimation factor d. The inventor's experiments have shown that there is some low-frequency correlation between an acoustic echo and a corresponding source signal, even when non-linear codecs are employed in the echo path, and that this correlation is higher for low-frequency components of a signal. As a result, acoustic echo delay may be estimated with relatively high accuracy by adaptively filtering the decimated signal, even though the adaptive filtering does not provide an accurate echo path estimation.

Decimation blocks 210 and 212 each may be implemented using a low-pass anti-alias linear filter. For example, suppose that incoming signal $R_{in}$ and outgoing signal $S_{out}$ each have a sampling frequency of 8 kHz. Decimation blocks 210 and 212 may be implemented as low-pass anti-alias linear filters, each having a cutoff frequency of 1 kHz, that decimate incoming signal $R_{in}$ and outgoing signal $S_{out}$, respectively, by a decimation factor of d=8. For acoustic echo delay estimation, highly precise low-pass filtering and exact filter estimation (i.e., updating of all filter coefficients) are not needed, and therefore, filters with lower complexity may be used.

NLMS block 214 is implemented in a computationally efficient manner. In particular, only filter coefficients in a specified range imin to imax are updated and used for filtering, where filter coefficient index imin corresponds to the minimum possible echo delay of the network and filter coefficient index imax corresponds to a value greater than or equal to the maximum possible echo delay. All other filter coefficients (e.g., 0 to imin-1 and any beyond imax) are set equal to zero. For example, in a typical wireless gateway, where the minimum possible echo delay is approximately 170 ms and the maximum possible echo delay is 250 ms, the first 169 filter coefficients may be set to zero (for a filter in which the spacing between filter coefficients is 1 ms), and filter coefficients imin=170 to imax=250 may be updated and used for filtering. Note that the NLMS filter is updated only when certain conditions are met, as discussed in further detail below in relation to NLMS update determination block 240. When these conditions are met, the NLMS filter is updated at the decimated frequency (e.g., 1 kHz).

The vector H(t) of NLMS filter coefficients corresponding to taps imin to imax applied by NLMS block 214 at time t may be represented as shown in Equation (1) below:

$$H(t)=H(t-1)+\mu e(t)XS_{out,d}(t)/\|XS_{out,d}(t)\|^2 \quad (1)$$

where H(t-1) is the vector of filter coefficients corresponding to taps imin to imax at time (t-1), $\mu$ is a step size, where $0<\mu<2$, e(t) is the estimated error at time t, and $\|\ \|$ is a Euclidian norm operator. Further, $XS_{out,d}(t)$ is a vector of the last L samples of the decimated signal $S_{out,d}$, where L corresponds to the number of echo path coefficients in the range imin to imax, and the last sample of the vector corresponds to time t. Estimated error e(t) may be represented according to Equation (2) as follows:

$$e(t)=R_{in,d}(t)-y(t) \quad (2)$$

where $R_{in,d}(t)$ is a sample of decimated signal $R_{in}$ at time t, and y(t) is the estimated echo at time t. The estimated echo y(t) may be represented as shown below in Equation (3):

$$y(t)=H(t)^T XS_{out,d}(t) \quad (3)$$

where $H(t)^T$ denotes the matrix transpose of vector H(t). Note that, due to the non-linearity of the acoustic echo and the decimation process, the accuracy of estimated echo y(t) is relatively low. However, the acoustic echo delay may still be estimated with relatively high accuracy as described next.

Each time that the NLMS block is applied, modulus block 216 determines the magnitude of each of the filter coefficients in vector H(t), and argmax block 218 determines the filter coefficient in vector H(t) having the largest magnitude. The group echo delay is defined as the delay corresponding to the largest filter coefficient. The index value corresponding to the largest filter coefficient is multiplied by the decimation factor d (e.g., 8) to generate a delay value corresponding to the original sampling frequency (e.g., 8 kHz), and the resulting delay value is provided to delay block 220 of echo activity detection block 204.

The delay value is used by delay block 220 to align outgoing signal $S_{out}$ with incoming signal $R_{in}$. In particular, delay block 220 uses the delay value to retrieve from memory the sample of outgoing signal $S_{out}$ that corresponds to the acoustic echo in the current sample of incoming signal $R_{in}$. In the example provided above, the memory may be sized to store 250 ms worth of samples.

The aligned samples $R_{in}(t)$ and $S_{out}(t)$ of incoming signal $R_{in}$ and outgoing signal $S_{out}$ at time t are provided to signal level smoothing blocks 222 and 224, respectively. Signal level smoothing block 222 generates smoothed signal level $LR_{in}(t)$ and signal level smoothing block 224 generates smoothed signal level $LS_{out}(t)$ in the linear amplitude domain as shown in Equations (4) and (5), respectively, below:

$$LR_{in}(t)=|R_{in}(t)|\alpha+LR_{in}(t-1)(1-\alpha) \quad (4)$$

$$LS_{out}(t)=|S_{out}(t)|\alpha+LS_{out}(t-1)(1-\alpha) \quad (5)$$

In Equation (4), $LR_{in}(t-1)$ is the smoothed signal level for the $(t-1)^{th}$ sample of incoming signal $R_{in}$. In Equation (5), $LS_{out}(t-1)$ is the smoothed signal level for the $(t-1)^{th}$ sample of outgoing signal $S_{out}$. Parameter $\alpha$ is a smoothing value that is found empirically, and that may have a value of, for example, approximately 0.1. According to some embodiments, parameter $\alpha$ can be (i) set to a larger value initially when reliable estimates of smoothed signal levels $LR_{in}(t)$ and $LS_{out}(t)$ are not available to arrive at reliable estimates quicker and (ii) set to a smaller value when reliable estimates of smoothed signal levels $LR_{in}(t)$ and $LS_{out}(t)$ are available. The smoothed signal levels $LR_{in}(t)$ and $LS_{out}(t)$ are subsequently decimated by the corresponding signal level smoothing block using a suitable decimating technique. For example, each smoothed signal level (i.e., $LR_{in}(t)$, $LS_{out}(t)$) may be decimated to a frequency of 1 kHz using an eight-sample averaging technique, wherein eight samples of the smoothed signal level are averaged to generate one sample in the decimated smoothed signal level (i.e., $LR_{in,d}(t)$, $LS_{out,d}(t)$).

According to alternative embodiments of the present invention, the signal levels of incoming signal $R_{in}$ and outgoing signal $S_{out}$ may be converted to logarithmic scale and subsequently smoothed in the logarithmic scale. However, converting to logarithmic scale is not necessary and adds complexity to the implementation of dataflow diagram 200.

Echo activity detection block 204 makes determinations as to whether or not substantially only acoustic echo is present in incoming signal $R_{in}$ by comparing instantaneous echo return loss (ERL) estimates $ERL(t)$ to smoothed ERL estimates $ERLsm(t)$.

Each instantaneous ERL estimate $ERL(t)$ is generated by ERL estimation block 226 as follows in Equation (6):

$$ERL(t) = LS_{out,d}(t) - LR_{in,d} \qquad (6)$$

Each instantaneous ERL estimate $ERL(t)$ represents the strength of the acoustic echo in incoming signal $R_{in}$ relative to the echo's source (i.e., outgoing signal $S_{out}$). Generally, larger instantaneous ERL estimates $ERL(t)$ correspond to softer acoustic echo, while smaller instantaneous ERL estimates $ERL(t)$ correspond to louder acoustic echo. However, when both the near-end and far-end users are speaking at the same time (i.e., doubletalk is occurring), the instantaneous ERL estimates $ERL(t)$ do not accurately reflect the strength of the acoustic echo relative to the echo's source. Thus, the values of the instantaneous ERL estimates $ERL(t)$ vary based on whether (i) only the near-end user is speaking, (ii) only the far-end user is speaking, or (iii) both the near-end and far-end users are speaking concurrently (i.e., doubletalk is occurring).

If the far-end user is speaking and acoustic echo is present in incoming signal $R_{in}$ (i.e., doubletalk is occurring), such that $LR_{in,d}(t)$ is larger than $LS_{out,d}(t)$, then the instantaneous ERL estimate $ERL(t)$ will have a negative value. If the far-end user is not speaking and acoustic echo is not present in incoming signal $R_{in}$ (i.e., the near-end speaker is not speaking), then the instantaneous ERL estimate $ERL(t)$ will have a value close to zero. If the far-end user is speaking and acoustic echo is not present in incoming signal $R_{in}$, then the instantaneous ERL estimate $ERL(t)$ will have a negative value. If the far-end user is not speaking and acoustic echo is present in incoming signal $R_{in}$, then the instantaneous ERL estimate $ERL(t)$ will have a positive value.

Each smoothed ERL estimate $ERLsm(t)$ is generated by ERL smoothing block 236 as shown below in Equation (7):

$$ERLsm(t) = ERL(t)/\beta + ERLsm(t-1)(1-\beta) \qquad (7)$$

where $\beta$ is a smoothing value that is determined empirically, and that may have a value of, for example, approximately 0.1. According to some embodiments, parameter $\beta$ can be (i) set to a larger value initially when reliable estimates of smoothed signal levels $LR_{in}(t)$ and $LS_{out}(t)$ are not available to arrive at reliable estimates quicker and (ii) set to a smaller value when reliable estimates of smoothed signal levels $LR_{in}(t)$ and $LS_{out}(t)$ are available The smoothed ERL estimates $ERLsm(t)$ are generated by ERL smoothing block 236 when the two conditions of decision block 232 are met: (i) relatively significant sounds other than mere background noise are detected in incoming signal $R_{in}$ and (ii) the instantaneous ERL value $ERL(t)$ is greater than a minimum ERL threshold minERL that is determined empirically.

The first condition is used to detect whether or not (i) audio signals corresponding to sounds, such as speech or music, originating at the far end and/or (ii) acoustic echo corresponding to outgoing signal $S_{out}$ are represented in incoming signal $R_{in}$. The second condition is used to detect whether or not the sounds represented in incoming signal $R_{in}$, if any, correspond to (i) acoustic echo without far-end speech (i.e., without doubletalk) or (ii) far-end speech with or without acoustic echo. In particular, if the first condition is satisfied (i.e., sounds are present in incoming signal $R_{in}$) and the sounds represented in incoming signal $R_{in}$ are much softer than sounds represented in outgoing signal $S_{out}$, then (i) acoustic echo is detected in incoming signal $R_{in}$ and (ii) speech originating from the far-end user is not detected in incoming signal $R_{in}$ (i.e., doubletalk is not occurring). Thus, to summarize, the smoothed ERL estimates $ERLsm(t)$ are updated by ERL smoothing block 236 only when (i) doubletalk is not detected, (ii) sounds such as speech are represented in outgoing signal $S_{out}$, and (iii) acoustic echo is detected in incoming signal $R_{in}$.

To determine whether or not sounds other than, or in addition to, background noise are represented in incoming signal $R_{in}$, voice activity detection (VAD) block 230 compares the smoothed signal level $LR_{in}(t)$ (from signal level smoothing block 222) to a specified threshold value LR_thresh that approximates the boundary between (i) energy levels in incoming signal $R_{in}$ that correspond to background noise only and (ii) energy levels in incoming signal $R_{in}$ that correspond to sounds other than, or in addition to, background noise, such as music and speech. If smoothed signal level $LR_{in}(t)$ is greater than LR_thresh, then voice activity detection flag VAD_Rin is set to true, indicating that sounds other than, or in addition to, background noise are detected. If smoothed signal level $LR_{in}(t)$ is not greater than LR_thresh, then voice activity detection flag VAD_Rin is set to false, indicating that only background noise or silence is detected, and consequently, sounds such as speech, music, or acoustic echo are not detected.

The VAD_Rin flag indicates that sounds are represented in incoming signal $R_{in}$ but does not indicate which types of sounds are represented. Thus, the instantaneous ERL estimate $ERL(t)$ is compared to the specified minimum ERL threshold minERL (e.g., 1 dB) to determine whether the sounds represented in incoming signal $R_{in}$ correspond to (i) acoustic echo without far-end speech (i.e., without doubletalk) or (ii) far-end speech with or without acoustic echo. If the VAD_Rin flag is set to true (i.e., the first condition of block 232 is met) and the instantaneous ERL estimate $ERL(t)$ is greater than the specified minimum ERL threshold minERL (i.e., the second condition of block 232 is met), then a smoothed ERL estimate $ERLsm(t)$ is generated in block 236 and provided to echo activity detection block 238. If either (i) the VAD_Rin flag is set to false or (ii) the instantaneous ERL estimate $ERL(t)$ is less than or equal to the specified minimum ERL threshold minERL (i.e., either or both conditions of block 232 are not satisfied), then block 234 provides the last generated smoothed ERL estimate $ERLsm(t-1)$ to echo activity detection block 238, which uses the previous smoothed ERL estimate $ERLsm(t-1)$ as the current smoothed ERL estimate $ERLsm(t)$. The VAD_Rin flag is set to false when VAD block 230 determines that no sounds such as speech, music, or acoustic echo are represented in incoming signal $R_{in}$.

Echo activity detection block 238 compares each instantaneous ERL estimate ERL(t) to the current smoothed ERL estimate ERLsm(t) decreased by a deviation value Δ (e.g., 3 dB). Deviation value Δ is used to account for errors that may arise when block 232 fails to detect doubletalk precisely. If ERL(t) is greater than ERLsm(t)−Δ, then the EAD flag is set to true, indicating that only acoustic echo is detected (i.e., doubletalk was not detected). If, on the other hand, ERL(t) is less than or equal to ERLsm(t)−Δ, then the EAD flag is set to false. The EAD flag represents a smoothed decision of whether echo or not acoustic echo is detected without doubletalk.

The EAD flag is used for two purposes. First, NLMS update determination block 240 uses the EAD flag along with the voice activity detection flag VAD_Rin from voice activity detection block 230 and another voice activity detection flag VAD_Sout from voice activity detection block 228 to determine whether or not to update the NLMS filtering coefficients. As described above, voice activity detection flag VAD_Rin is set to true when sounds other than, or in addition to, background noise are detected in incoming signal $R_{in}$, and false when only background noise or silence is detected. Similar to voice activity detection block 230, voice activity detection block 228 determines whether sounds other than, or in addition to, background noise are represented in outgoing signal $S_{out}$. In particular, VAD block 228 sets the value of voice activity detection flag VAD_Sout by comparing smoothed signal level $LS_{out}(t)$ to a specified threshold value LS_thresh that approximates the boundary between (i) energy levels in outgoing signal $S_{out}$ that correspond to background noise only and (ii) energy levels in outgoing signal $S_{out}$ that correspond to sounds other than, or in addition, to background noise, such as music and speech. If smoothed signal level $LS_{out}(t)$ is greater than LS_thresh, then voice activity detection flag VAD_Sout is set to true, indicating that sounds other than, or in addition to, background noise are detected. If smoothed signal level $LS_{out}(t)$ is not greater than LS_thresh, then voice activity detection flag VAD_Sout is set to false, indicating that only background noise or silence is detected.

If (i) the EAD flag is set to true, indicating that only echo activity is detected (i.e., doubletalk is not detected), (ii) the VAD_Sout flag is set to true, indicating that sounds such as speech or music are present in outgoing signal $S_{out}$, and (iii) the VAD_Rin flag is set to true, indicating that acoustic echo is present in incoming signal $R_{in}$, then NLMS update determination block 240 sets the NLMS update flag to true. As a result, NLMS filter coefficients of NLMS block 214 are updated. If any one of the EAD, VAD_Sout, or VAD_Rin flags is set to false, then the NLMS filter coefficients are not updated. Requiring echo activity to be detected and sounds such as speech or music to be present in signals $R_{in}$ and $S_{out}$ ensures the proper and fast convergence of the NLMS filter.

The EAD flag is also used to control the amount of acoustic echo suppression applied by echo control block 208. The amount of echo suppression is gradually transitioned between no echo suppression on the one hand and complete echo suppression on the other hand. Gradual transition is achieved using echo suppression amount determination block 206, which receives the EAD flag from echo activity decision block 238. Decision block 242 of echo suppression amount determination block 206 determines whether or not the EAD flag is set to true. If the flag is set to true, then increment block 246 increases the echo activity detection counter EAD_Cnt by one. If the flag is set to false, then reset block 244 resets the echo activity detection counter EAD_Cnt to zero.

Upon each update of the echo activity counter EAD_Cnt, the counter value is compared to a specified minimum counter threshold min_EAD_Cnt by decision block 248. The result of the comparison is used to gradually transition a gain value G(t), which is used to control the amount of echo suppression, between values of zero and one. A gain value equal to zero (i.e., G(t)=0) corresponds to complete echo suppression, while a gain value equal to one (i.e., G(t)=1) corresponds to no echo suppression.

If echo activity detection counter EAD_Cnt is greater than the specified minimum counter threshold value min_EAD_Cnt, then gain update block 250 calculates the gain value G(t) as shown in Equation (8):

$$G(t)=\max((1-\lambda_1)G(t-1)),0) \quad (8)$$

If, on the other hand, echo activity detection counter EAD_Cnt is not greater than the specified minimum counter threshold value min_EAD_Cnt, then gain update block 252 calculates the gain value G(t) as shown in Equation (9):

$$G(t)=\min((1+\lambda_2)G(t-1)),1) \quad (9)$$

Equation (8) is used to decrease the gain value G(t) towards a value of zero when acoustic echo is detected for a specified length of time (i.e., when EAD_Cnt>min_EAD_Cnt) without a detection of doubletalk. Equation (9) is used to increase the gain value G(t) towards a value of one when acoustic echo is not detected for a specified length of time (i.e., when EAD_Cnt≤min_EAD_Cnt) without a detection of doubletalk. Parameters $\lambda_1$ and $\lambda_2$ are update speed constants that regulate the speed with which the gain value G(t) is changed. The update speed constants $\lambda_1$ and $\lambda_2$ range from zero to one. In one implementation, values of 0.4 and 0.2 were used for $\lambda_1$ and $\lambda_2$, respectively, such that the gain value G(t) was allowed to decrease faster than it was allowed to increase. In real world implementations, it has been observed that acoustic echo gain tends to decrease at a relatively quick rate but increase at a relatively slow rate.

Note that the comparison of counter EAD_Cnt to the minimum EAD counter threshold min_EAD_Cnt in block 248 is performed at the decimated frequency (e.g., 1 kHz), since the instantaneous ERL estimates ERL(t), smoothed ERL estimates ERLsm(t), and EAD decisions were all updated at the decimated frequency. The gain value G(t), on the other hand, is updated at the original sampling frequency (e.g., 8 kHz). Therefore, each comparison performed by decision block 248 is used d times (e.g., 8 times) to update the gain value G(t) at the original sampling frequency.

Once the gain value G(t) has been updated, echo control block 208 calculates a filtered incoming sample $R_{out}(t)$ as follows:

$$R_{out}(t)=R_{in}(t)G(t)+\text{Noise}(1-G(t)) \quad (10)$$

where Noise is the comfort noise signal received from, for example, noise generation module 102 of FIG. 1. As the gain value G(t) is decreased in Equation (8) toward a value of zero, the amount of acoustic echo suppression is increased and the amount of comfort noise added is increased. As the gain value G(t) is increased in Equation (9) toward a value of one, the amount of acoustic echo suppression is decreased and the amount of comfort noise added decreased.

The embodiment of FIG. 2 represents a compromise between complexity and quality of acoustic echo suppression. Typical prior-art echo control techniques perform acoustic echo detection and suppression in the frequency domain, which requires the use of Fourier processing such as Fast Fourier Transform (FFT) processing. Certain embodiments of the present invention, on the other hand, perform echo detection and suppression in the time domain so that FFT processing is not needed. As a result, certain embodiments of the present invention perform echo detection and suppression with lower complexity and lower latency than that of prior-art frequency-domain techniques. At the same time, certain embodiments of the present invention provide echo suppression quality comparable to the prior-art frequency domain techniques.

The complexity of FIG. 2 may be computed as follows. The complexity of each decimation block 210 and 212 is approximately C multiplications, where C is a size of the filter (e.g., C=17 in one implementation). The complexity of NLMS block 214 is less than or equal to approximately 2(imax−imin+1)+2 multiplications and one division for each decimated sample since only the filter coefficients from imin to imax are updated and used for filtering. Modulus block 216 and argmax block 218 do not require any additional multiplications. The complexity of signal level smoothing blocks 222 and 224 is four multiplications for each sample. The complexity for ERL smoothing block 236 is two multiplications for each decimated sample (i.e., $2/8 = 1/4$ multiplications per sample of the original time scale). VAD Rin block 230, VAD Sout block 228, echo activity detection block 238, and EAD counter blocks 244 and 246 are implemented without multiplications, so their complexity is not taken into account. The complexity of the G(t) blocks 250 and 252 is one multiplication and one comparison. The complexity of echo control block 208 is two multiplications per sample.

Summarizing the above complexity estimates, the total complexity of FIG. 2 is approximately $2C+[2(\text{imax}-\text{imin}+1)+2]/8+4+1/4+2$ multiplications and $1+1/8$ divisions per sample. Based on a C value of 17, an imin value of 170, and an imax value of 250, the complexity for one second is approximately $(34+21+4+2)\times 8000 \approx 0.5$ million multiplications and 9,000 divisions. Typical prior-art FFT-based acoustic echo suppression approaches apply one FFT on every frame of incoming signal $R_{in}$ and outgoing signal $S_{out}$, and one inverse FFT on every frame of incoming signal $R_{in}$. Given a typical frame size of 40 samples and a 128-point FFT, the typical prior-art FFT-based acoustic echo suppression approaches perform at least $2\times 128+3\times 128\times \log 2(64)=2,560$ multiplications per frame (i.e., over 0.5 million multiplications per second) for the FFT processing and Hamming windowing operations alone. Additionally, in FFT-based acoustic echo suppression approaches, every sample of the FFT spectrum is multiplied by a real gain factor that results in an additional $2\times 64$ multiplications per frame (i.e., 25,000 multiplications per second). The FFT-based acoustic echo suppression approaches also apply signal overlapping and spectral gain calculations, which require further multiplications. Thus, the time-domain approach of certain embodiments of the present invention has a complexity comparable to or even less than that of typical prior-art FFT-based acoustic echo suppression approaches.

In addition to having lower complexity than prior-art FFT-based acoustic echo suppression approaches, certain embodiments of the present invention may be used in systems where the acoustic echo and the corresponding source signal have a non-linear relationship due to, for example, codecs. Unlike prior-art echo cancellers that use NLMS filtering to estimate the echo path, certain embodiments of the present invention use NLMS filtering to estimate only the group echo delay. This group delay estimation technique permits acoustic echo control modules of certain embodiments of the present invention to track echo delay changes in a dynamically changing echo delay environment. Certain embodiments of the present invention also work relatively well with both (i) relatively long echo path delays (e.g., 200 ms or longer) and (ii) relatively long echo paths.

It will be further understood that various changes in the details, materials, and arrangements of the parts which have been described and illustrated in order to explain the nature of this invention may be made by those skilled in the art without departing from the scope of the invention as expressed in the following claims. For example, although the present invention was described relative to its use with an NLMS algorithm, the present invention is not so limited. The present invention may also be used with suitable filtering algorithms other than the NLMS algorithm, including, but not limited to, the recursive least squares (RLS) algorithm and the proportionate NLMS (PNLMS) algorithm.

As another example, the present invention may be implemented using suitable, and possibly more-complex, voice activity detection techniques other than those described above in relation to voice activity detection blocks 228 and 230.

As yet another example, the present invention may be implemented using a thresholding technique other than that described in relation to echo suppression amount determination block 206. For instance, rather than incrementing EAD_Cnt by one when the EAD flag is set to true and resetting EAD_Cnt to zero when the EAD flag is set to false, EAD_Cnt could be increased by adding a specified amount other than one or multiplying by a weight factor greater than one when the EAD flag is set to true and decreased by subtracting a specified amount or multiplying by a weight factor less than one when the EAD flag is set to false.

As yet still another example, echo suppression amount determination block 206 could be eliminated altogether such that gain value G(t) is updated by (i) gain update block 250 when the EAD flag is set to true and (ii) gain update block 252 when the EAD flag is set to false.

As even yet still another example, gain value G(t) could be updated using different equations.

Further, the present invention may be implemented such that the instantaneous ERL estimates are generated as a ratio of incoming signal $R_{in}$ and outgoing signal $S_{out}$, rather than a difference between these two values. In such embodiments, the minimim ERL threshold minERL and deviation value $\Delta$ are determined based on the instantaneous ERL values being calculated as ratios rather than differences.

Although the present invention was described as performing operating blocks 202, 204, and 206 at a decimated frequency to reduce complexity, the present invention is not so limited. The present invention may be implemented using decimation factors other than d=8, including a decimation factor of d=1, which corresponds to no decimation (i.e., the original sampling rate). Further, the present invention is not limited to operating blocks 202, 204, and 206 at the same decimated rate. For example, blocks 202 and 204 could be operated at a decimated rate (e.g., d=8), while block 206 could be operated at the original sampling rate (i.e., d=1). In this case, the EAD flag provided by echo activity detection 238 is used to update the counter EAD_Cnt eight times every time the EAD flag is updated. Thus, when the EAD flag is set to true, EAD_Cnt is incremented eight times, and, when the EAD flag is set to false, EAD_Cnt is reset eight times. Note that the minimum EAD counter threshold value min_EAD_cnt is also increased eightfold to account for the possibly larger values of EAD_Cnt.

Although the present invention was described in the context of telephone networks, the present invention is not so limited. The present invention may be used in any suitable application in which acoustic echo is generated. For example, the present invention may also be used to cancel acoustic echo generated during a video conference call transmitted over the internet.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose or other processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes or ports may be referred to by the same name and are interchangeable for purposes here.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A processor-implemented method for processing a signal, the method comprising:
    (a) generating, in a time domain, a gain value corresponding to how much acoustic echo to suppress in the signal, wherein step (a) comprises:
        (a1) generating a counter value indicating how long acoustic echo has been detected in the signal without a detection of doubletalk;
        (a2) comparing the counter value to a specified counter threshold value; and
        (a3) adjusting the gain value based on the comparison of step (a2); and
    (b) applying the gain value to the signal in the time domain.

2. The processor-implemented method of claim 1, wherein step (a3) comprises:
    (a3i) decreasing the gain value towards zero if the counter value is determined to be greater than the specified counter threshold value; and
    (a3ii) increasing the gain value towards one if the counter value is determined to be less than the specified counter threshold value.

3. The processor-implemented method of claim 1, wherein step (a1) comprises:
    (a1i) generating an echo return loss (ERL) value for the signal;
    (a1ii) comparing the ERL value to a specified ERL threshold value;
    (a1iii) generating a signal-level value for the signal;
    (a1iv) comparing the signal-level value to a specified signal-level threshold value; and
    (a1v) detecting that acoustic echo exists in the signal without detecting doubletalk based on (i) the comparison of step (a1ii) and (ii) the comparison of step (a1iv).

4. The processor-implemented method of claim 3, wherein step (a1v) comprises detecting that acoustic echo exists in the signal without detecting doubletalk if (i) the ERL value is greater than the specified ERL threshold value and (ii) the signal-level value is greater than the specified signal-level threshold value.

5. The processor-implemented method of claim 1, wherein:
    the signal is an incoming signal received at near-end user equipment;
    the acoustic echo is generated by a microphone of far-end user equipment based on sounds generated by a loudspeaker of the far-end user equipment based on an outgoing signal transmitted from the near-end user equipment to the far-end user equipment; and
    step (a) comprises comparing the incoming signal to the outgoing signal in the time domain to determine how much acoustic echo to suppress in the incoming signal.

6. The processor-implemented method of claim 5, wherein step (a) comprises:
    (a1) determining, in the time domain, amount of delay in timing of the acoustic echo relative to timing of the outgoing signal;

(a2) delaying a copy of the outgoing signal by the determined amount of delay;

(a3) generating, in the time domain, an echo return loss (ERL) value based on (i) signal level of the delayed copy of the outgoing signal and (ii) signal level of the incoming signal; and (a4) using the ERL value to determine, in the time domain, how much acoustic echo to suppress in the signal.

7. Apparatus comprising a processor adapted to process a signal, the apparatus comprising:
an acoustic echo detector adapted to generate, in a time domain, a gain value corresponding to how much acoustic echo to suppress in the signal, wherein the acoustic echo detector is adapted to:
generate a counter value indicating how long acoustic echo has been detected in the signal without a detection of doubletalk;
compare the counter value to a specified counter threshold value; and
adjust the gain value based on the comparison of the counter value to the specified counter threshold value; and
an acoustic echo controller adapted to apply the gain value to the signal in the time domain.

8. The apparatus of claim 7, wherein the acoustic echo detector is adapted to:
decrease the gain value towards zero if the counter value is determined to be greater than the specified counter threshold value; and
increase the gain value towards one if the counter value is determined to be less than the specified counter threshold value.

9. The apparatus of claim 7, wherein the acoustic echo detector is adapted to:
generate an echo return loss (ERL) value for the signal;
compare the ERL value to a specified ERL threshold value;
generate a signal-level value for the signal;
compare the signal-level value to a specified signal-level threshold value; and
detect that acoustic echo exists in the signal without detecting doubletalk based on (i) the comparison of the ERL value to the specified ERL threshold value and (ii) the comparison of the signal-level value to the specified signal-level threshold value.

10. The apparatus of claim 9, wherein the acoustic echo detector is adapted to detect that acoustic echo exists in the signal without detecting doubletalk if (i) the ERL value is greater than the specified ERL threshold value and (ii) the signal-level value is greater than the specified signal-level threshold value.

11. The apparatus of claim 7, wherein:
the signal is an incoming signal received at near-end user equipment;
the acoustic echo is generated by a microphone of far-end user equipment based on sounds generated by a loudspeaker of the far-end user equipment based on an outgoing signal transmitted from the near-end user equipment to the far-end user equipment; and
the acoustic echo detector is adapted to compare the incoming signal to the outgoing signal in the time domain to determine how much acoustic echo to suppress in the incoming signal.

12. The apparatus of claim 11, wherein the acoustic echo detector is adapted to:
determine, in the time domain, amount of delay in timing of the acoustic echo relative to timing of the outgoing signal;
delay a copy of the outgoing signal by the determined amount of delay;
generate, in the time domain, an echo return loss (ERL) value based on (i) signal level of the delayed copy of the outgoing signal and (ii) signal level of the incoming signal; and
use the ERL value to determine, in the time domain, how much acoustic echo to suppress in the signal.

13. The apparatus of claim 7, wherein the apparatus is an integrated circuit.

14. A processor-implemented method for processing a signal, the method comprising:
(a) determining, in a time domain, how much acoustic echo to suppress in the signal; and
(b) processing the signal in the time domain based on the determination of how much acoustic echo to suppress, wherein:
the signal is an incoming signal received at near-end user equipment;
the acoustic echo is generated by a microphone of far-end user equipment based on sounds generated by a loudspeaker of the far-end user equipment based on an outgoing signal transmitted from the near-end user equipment to the far-end user equipment; and
step (a) comprises comparing the incoming signal to the outgoing signal in the time domain to determine how much acoustic echo to suppress in the incoming signal, wherein step (a) comprises:
(a1) determining, in the time domain, amount of delay in timing of the acoustic echo relative to timing of the outgoing signal;
(a2) delaying a copy of the outgoing signal by the determined amount of delay;
(a3) generating, in the time domain, an echo return loss (ERL) value based on (i) signal level of the delayed copy of the outgoing signal and (ii) signal level of the incoming signal; and
(a4) using the ERL value to determine, in the time domain, how much acoustic echo to suppress in the signal.

15. Apparatus comprising a processor adapted to process a signal, the apparatus comprising:
an acoustic echo detector adapted to determine, in a time domain, how much acoustic echo to suppress in the signal; and
an acoustic echo controller adapted to process the signal in the time domain based on the determination of how much acoustic echo to suppress in the signal, wherein:
the signal is an incoming signal received at near-end user equipment;
the acoustic echo is generated by a microphone of far-end user equipment based on sounds generated by a loudspeaker of the far-end user equipment based on an outgoing signal transmitted from the near-end user equipment to the far-end user equipment; and
the acoustic echo detector is adapted to compare the incoming signal to the outgoing signal in the time domain to determine how much acoustic echo to suppress in the incoming signal, wherein the acoustic echo detector is adapted to:
determine, in the time domain, amount of delay in timing of the acoustic echo relative to timing of the outgoing signal;
delay a copy of the outgoing signal by the determined amount of delay;

generate, in the time domain, an echo return loss (ERL) value based on (i) signal level of the delayed copy of the outgoing signal and (ii) signal level of the incoming signal; and use the ERL value to determine, in the time domain, how much acoustic echo to suppress in the signal.

\* \* \* \* \*